United States Patent
De Mattia

(10) Patent No.: US 10,029,414 B2
(45) Date of Patent: Jul. 24, 2018

(54) METHOD FOR PRODUCING PART OF AN AIRCRAFT FUSELAGE AND TOOL FOR IMPLEMENTING SAID METHOD

(71) Applicant: Airbus Operations (S.A.S.), Toulouse (FR)

(72) Inventor: Denis De Mattia, Basse Goulaine (FR)

(73) Assignee: Airbus Operations (S.A.S.), Toulouse (FR)

( * ) Notice: Subject to any disclaimer, the term of this patent is extended or adjusted under 35 U.S.C. 154(b) by 551 days.

(21) Appl. No.: 14/600,442

(22) Filed: Jan. 20, 2015

(65) Prior Publication Data
US 2015/0202824 A1    Jul. 23, 2015

(30) Foreign Application Priority Data
Jan. 21, 2014 (FR) .................................. 14 50447

(51) Int. Cl.
| | |
|---|---|
| *B29C 67/00* | (2017.01) |
| *B29C 33/30* | (2006.01) |
| *B64F 5/10* | (2017.01) |
| *B29L 31/30* | (2006.01) |

(52) U.S. Cl.
CPC ........ *B29C 67/0011* (2013.01); *B29C 33/307* (2013.01); *B29C 33/308* (2013.01); *B64F 5/10* (2017.01); *B29L 2031/3082* (2013.01)

(58) Field of Classification Search
CPC . B29C 67/0011; B29C 33/308; B29C 33/307; B64F 5/10; B29L 2031/3082
See application file for complete search history.

(56) References Cited

U.S. PATENT DOCUMENTS

| | | |
|---|---|---|
| 8,628,041 B2 | 1/2014 | Mialhe et al. |
| 2013/0206710 A1 | 8/2013 | Roschat et al. |

FOREIGN PATENT DOCUMENTS

| | | |
|---|---|---|
| EP | 2404824 | 1/2012 |
| EP | 2530021 | 12/2012 |

OTHER PUBLICATIONS

French Search Report for Application No. 1450447 dated Oct. 21, 2014.

*Primary Examiner* — John C Hong
(74) *Attorney, Agent, or Firm* — Jenkins, Wilson, Taylor & Hunt, P.A.

(57) ABSTRACT

The subject matter disclosed herein relates to a method for assembling at least one panel and frames for producing part of an aircraft fuselage, the method including shaping the panel on support surfaces of a tool, wherein it includes holding each frame clamped against at least one sliding support surface arranged in a transverse plane, the sliding support surfaces of the various frames and the support surfaces being secured to the same tool and positioned relative to one another, and in putting in place permanent attachment elements for connecting the panel and the frames. The subject matter disclosed herein also proposes a tool for implementing the assembly method.

6 Claims, 3 Drawing Sheets

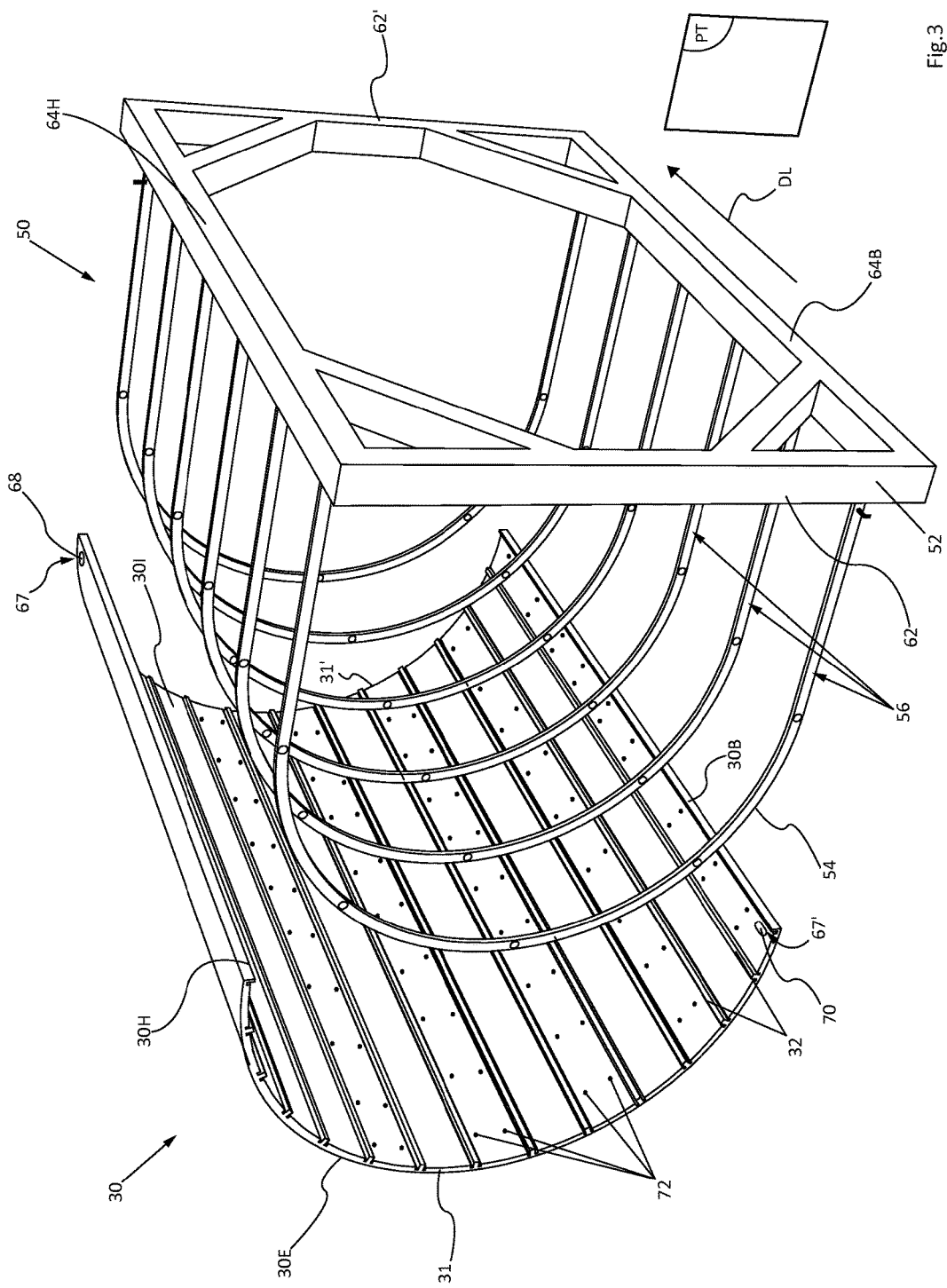

METHOD FOR PRODUCING PART OF AN AIRCRAFT FUSELAGE AND TOOL FOR IMPLEMENTING SAID METHOD

CROSS-REFERENCE TO RELATED APPLICATION

This application claims priority to FR 14 50447 filed Jan. 21, 2014, the entire disclosure of which is incorporated by reference herein.

TECHNICAL FIELD

The subject matter disclosed herein relates to a method for producing part of an aircraft fuselage and to a tool for implementing the method.

BACKGROUND

For the remainder of the present disclosure, a longitudinal axis corresponds to the axis which extends from the front tip to the rear tip of an aircraft. A longitudinal direction is a direction parallel to the longitudinal axis. A longitudinal plane corresponds to a plan containing the longitudinal axis. A transverse plane corresponds to a plane perpendicular to the longitudinal axis. A radial direction is a direction perpendicular to the longitudinal axis. An internal face or surface corresponds to a face or surface oriented towards the interior of the fuselage and an external face or surface corresponds to a face or surface oriented towards the exterior of the fuselage.

As is known, the fuselage of an aircraft comprises a structure which is principally responsible for taking up the forces and to which is attached an envelope, also called the skin, which gives the aircraft its aerodynamic properties.

According to an embodiment shown in FIGS. 1A and 1B, the skin comprises multiple juxtaposed panels 10, reinforced by stringers 12 attached to the internal face of the panels 10. The stringers 12 are arranged in longitudinal planes.

The structure comprises frames 14 which are arranged in transverse planes and are spaced apart in the longitudinal direction. In longitudinal planes, the frames 14 have a Z-shaped cross section with a web 16 arranged in a transverse plane and two flanges 18, 18' connected to the web 16 and perpendicular to the web 16.

In order to form the fuselage, the reinforced panels 10 and the frames 14 are connected using clips 20.

Each clip 20 comprises at least two flanges 22.1 and 22.2 connected to one another so as to form an angle bar, a first flange 22.1 clamped against the internal face of a panel 10 and a second flange 22.2 clamped against the web 16 of a frame 14.

As shown in FIG. 1A, a clip 20' may have a more complex shape and may comprise a bracket 24 connecting two flanges.

The first flange 22.1 of each clip 20 is secured to the panel 10 by attachment elements 26 such as bolts or rivets. These attachment elements 26 comprise milled heads which are housed in milled portions provided in the external face of the panel 10 so as to not impair the aerodynamic properties of the fuselage.

The second flange 22.2 of each clip 20 is secured to the web 16 using attachment elements 28 such as bolts or rivets.

According to a first operating method, each panel 10 is produced and reinforced with the stringers 12 while flat. This solution makes it possible to simplify the method for manufacturing the reinforced panels 10. Thus, in the case of panels 10 and stringers 12 made of composite material, it is possible to automate the method for manufacturing the reinforced panels, in particular by using automatic lay-up machines.

Then, the planar panel 10 reinforced with the stringers 12 is shaped on a first tool so as to give it its curved shape. This curved shape varies depending on the position of the panel 10 in the fuselage. After this shaping step, the external face of the panel 10 extends along a reference surface.

Depending on the position of the panel in the fuselage, this reference surface is developable and approximately semi-cylindrical or it is not developable for the panels close to the front tip or to the rear tip of the aeroplane.

This first tool comprises a scaffold which supports at least one support surface against which is clamped the internal face of the panel 10. The scaffold and the support surfaces are designed to be rigid and to retain their shape when the panel deforms.

The frames 14 are arranged one by one on a second tool. This second tool makes it possible to position the frames 14 according to their reference positions in the fuselage.

This second tool comprises a scaffold which supports ring portions called ribs, one for each frame. Each rib comprises a support surface against which is clamped the web of the frame in order to position it in a transverse plane and three locating pins for positioning and immobilizing the frame in the transverse plane.

Once the frames are positioned, the panel 10, reinforced and shaped along the reference surface, is positioned relative to the frames 14.

After positioning the panel 10 relative to the frames 14, the clips 20, the frames and the panel are assembled. For each clip 20, a first flange 22.1 of the clip comes to bear against the internal face and a second flange 22.2 of the clip comes to bear against the web 16 of the frame. The clips are positioned so as to be distributed all along each frame. In order to facilitate this placement, the second tool comprises, for each clip, a stop by which it can be positioned along the frame. Before the attachment elements 26, 28 are installed, the clips are held in position using pins.

In order to control the contact force between the assembled parts, a clamping force is applied to the parts to be assembled at every tenth attachment point. The clearance between the parts to be assembled must be of the order of 0.3 mm for a force of 20 daN. If this clearance is greater than 0.3 mm, shims are arranged between the parts. This method consisting in measuring, under load, the clearance between the parts makes it possible to control the internal stresses induced during assembly.

Finally, the attachment elements 26, 28 are installed so as to connect the clip 20 to the panel 10 on one hand, and the clip 20 to the frame 14 on the other hand.

This first operating method is difficult to automate. A first constraint is that it is necessary to provide a first automatic installation means arranged inside the fuselage in order to install the attachment elements 28 connecting the clips to the frames, and a second automatic installation means outside the fuselage in order to install the attachment elements 26 between the panel and the clips which must be installed from outside the fuselage because of the presence of the milled portions. Another constraint is that the second tool must make it possible to hold the elements to be assembled, that is to say the panel, the frames and the clips according to their reference positions. Given these constraints, this assembly is carried out by operators equipped with drilling units.

According to a second operating method described in document EP-2.404.824, the frames are arranged one by one on a tool according to their reference positions in the fuselage.

To that end, the tool comprises a scaffold which supports ring portions called ribs, one for each frame. Each rib comprises a support surface against which is clamped the web of the frame in order to position it in a transverse plane and three locating pins in order to position the frame in the transverse plane.

Once the frames are positioned, the flat panel 10, reinforced by the stringers, is deformed on the frames which replace the first tool of the first operating method. Then, the panel and the frames are assembled using connection elements. According to this document, the frames have a particular hollow cross section, and each comprise a face clamped against the panel such that it is possible to dispense with the clips.

Even though, in theory, this second operating method can make it possible to automate the assembly using an automatic means for installing attachment elements from outside the fuselage, it is not satisfactory for the following reasons.

A first drawback is that this operating method does not make it possible to control the internal stresses induced during assembly of the panel and of the frames, in particular if the panel has a reference surface which is not developable.

At the contact points between the frame and the panel, it is not possible to determine the contact force between the frame and the panel and thus control the stresses induced during assembly.

This is also the case for those regions in which the clearance is less than 0.3 mm when under load.

If the clearance between the frame and the panel when under load is greater than 0.3 mm, it is necessary to put in place shims. It is then necessary to remove the panel to put in place the shims then reposition it once the shims have been put in place. However, in the case of a panel with a reference surface which is not developable, it is very difficult to reposition it in the same manner.

Another drawback is that, when the contact surfaces of the parts to be assembled are coated with a sealing mastic, this mastic prevents the parts from sliding relative to one another in order to adjust their relative position.

Finally, another drawback is that the frames must be rigid in order not to deform when the panel is shaped. Consequently, frames having a Z-shaped cross section cannot be used as this cross section does not provide sufficient torsional and flexural inertia. In order to stiffen them, it would be possible to increase the number of locating pins used to position each frame on its rib. However, in this case, as for the hollow cross section frames, it is not possible to control the internal stresses induced during assembly.

SUMMARY

Thus, the subject matter disclosed herein aims to remedy the drawbacks of the prior art.

To that end, the subject matter disclosed herein relates to a method for assembling at least one panel and frames for producing part of an aircraft fuselage, the method comprising a step of shaping the panel on support surfaces of a tool, the method comprising holding each frame clamped against at least one sliding support surface arranged in a transverse plane, the sliding support surfaces of the various frames and the support surfaces being secured to the same tool and positioned relative to one another, and in putting in place permanent attachment elements for connecting the panel and the frames.

This method makes it possible to automate assembly as in the second operating method of the prior art by automatically installing the attachment elements, by structure arranged outside the fuselage.

Another advantage, in contrast to the second operating method of the prior art, is that the presence of the support surfaces makes it possible not to use the frames as a tool, such that it is possible to use frames having Z-shaped cross sections.

Another advantage is that the fact that the frames bear against a sliding support surface makes it possible to control the internal stresses induced during assembly.

Advantageously, the method comprises positioning each frame with respect to its sliding support surface after having shaped the panel. Contrary to the second embodiment, it is simpler to position the frames one after another relative to the panel than to position the panel with respect to all the frames simultaneously.

For preference, each frame is positioned by immobilizing it along its line of curvature (Lc) while allowing a translational movement in a radial direction. According to this operating method, each frame is positioned with respect to a positioner arranged equidistant from the ends of the frame, then its ends are unrolled so as to come into contact with the panel.

According to another feature, the method comprises using at least one brace for holding each frame clamped against the sliding support surface, the brace comprising a counter-support in contact with the frame which allows the frame to move in translation in the radial direction.

According to another feature, the method comprises using straps for holding the panel clamped against the support surfaces.

The subject matter disclosed herein also relates to a tool for implementing the assembly method. This tool comprises support surfaces with at least one radius of curvature in a transverse plane for shaping the panel, and for each frame, at least one sliding support surface arranged in a transverse plane, the sliding support surfaces of the various frames and the support surfaces being secured to the tool and positioned relative to one another.

Advantageously, for each frame, the tool comprises a rib with a rigid structure which extends in a transverse plane with a peripheral support surface and on one of its faces at least one sliding support surface parallel to a transverse plane.

For preference, each rib comprises at least one positioner by which it is possible to immobilize a frame along its line of curvature while allowing a translational movement in a radial direction. According to one embodiment, each rib comprises a single positioner arranged equidistant from the ends of each frame.

According to one feature of the subject matter disclosed herein, each rib comprises at least one brace for holding each frame clamped against the sliding support surface, the brace comprising a counter-support which allows the frame to move in translation in the radial direction. According to one embodiment, the counter-support takes the form of a roller mounted such that it can pivot on a pivot spindle arranged in a transverse plane and perpendicular to the radial direction.

According to one feature of the subject matter disclosed herein, the tool comprises straps for holding the panel clamped against the support surfaces. According to one embodiment, the tool comprises a scaffold with an upper crosspiece and a lower crosspiece, each support surface comprising a strip of material which extends from the upper crosspiece to the lower crosspiece, and the straps being arranged facing the support surfaces.

BRIEF DESCRIPTION OF THE DRAWINGS

Other features and advantages will emerge from the following purely exemplary description of the subject matter disclosed herein, given with reference to the appended drawings, in which:

FIG. 3 is a perspective view of a tool showing the subject matter disclosed herein before the placement of a panel;

DETAILED DESCRIPTION

Figure 1A:
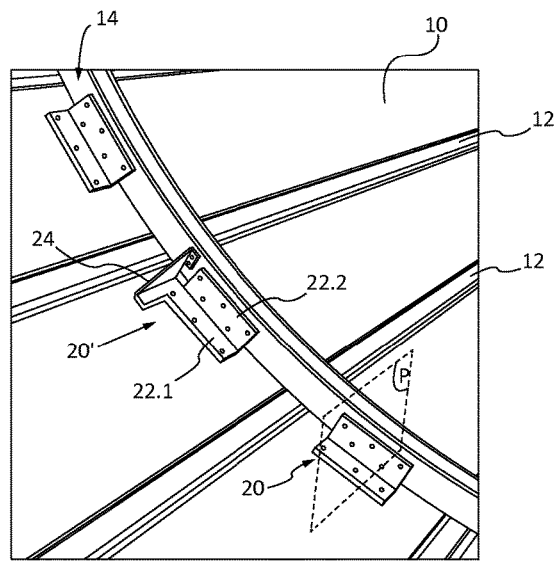
FIG. 1A is a perspective view of part of an aircraft fuselage.
Figure 1B:
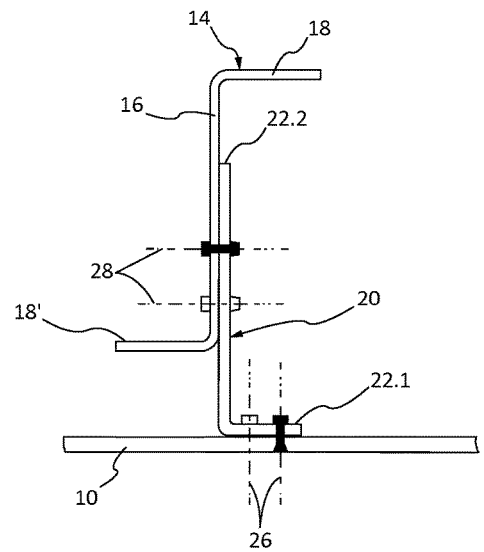
FIG. 1B is a section through the plane P in FIG. 1A.

For the description, once assembled, the panel 30 extends over half a section of the fuselage and is semi-cylindrical with a radius of curvature in a transverse plane. Of course, the subject matter disclosed herein is not limited to this form. Thus, the panel 30 may have a shape the to be not developable with a double radius of curvature.

FIGS. 2A, 2B, 3 to 5 show, labelled 30, a panel of part of an aircraft fuselage.

This panel 30 comprises an internal face 30I and an external face 30E and is reinforced by stringers 32 attached to the internal face 30I. It is delimited by an upper edge 30H, a lower edge 30B and lateral edges 31, 31'. By way of example, each lateral edge is arranged in a transverse plane. The upper edge 30H corresponds to a portion of an upper generatrix of the fuselage. The lower edge 30B corresponds to a portion of a lower generatrix of the fuselage.

According to one embodiment, the panel 30 and the stringers 32 are made of composite material. Other materials could be envisioned.

In order to obtain a part of the fuselage, the reinforced panel 30 is attached to frames 34 arranged in parallel planes (corresponding to transverse planes PT) and spaced apart along a direction (corresponding to the longitudinal direction DL). Thus, the frames 34 are positioned against the internal face 30I of the panel 30.

Figure 2A:
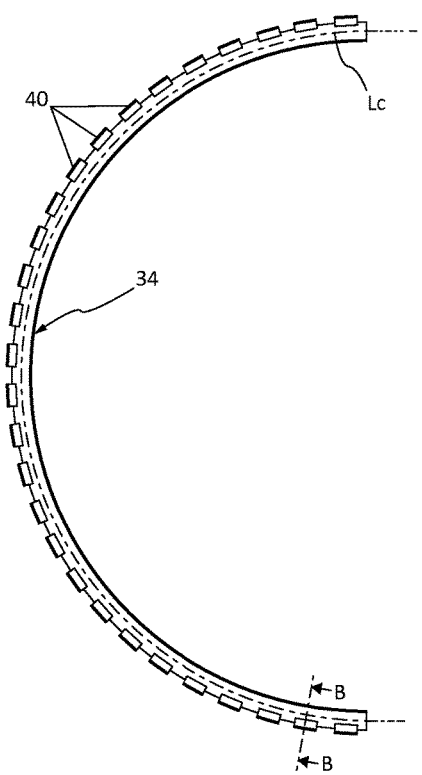
FIG. 2A is a side view of a frame equipped with clips.
Figure 2B:
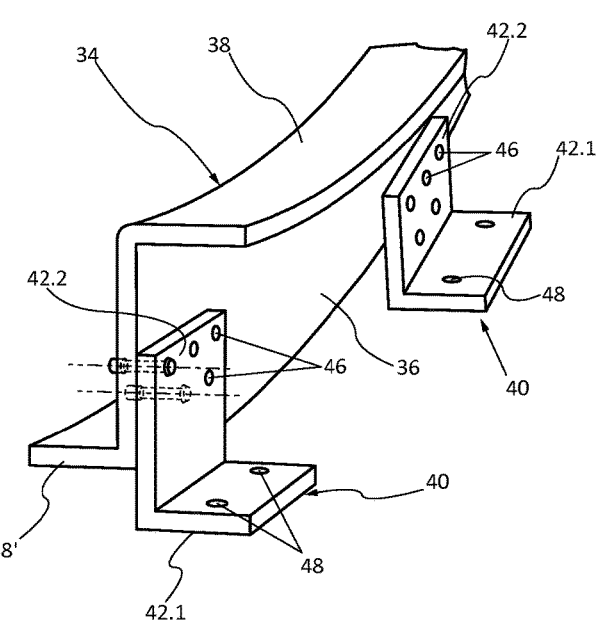
FIG. 2B is a section through the line BB in FIG. 2A.

According to one embodiment, shown in FIGS. 2A and 2B, each frame 34 comprises a profile which extends along a line of curvature Lc corresponding approximately to a semi-circle. This profile has a Z-shaped cross section. Thus, each frame comprises a web 36 with at each end flanges 38, 38' substantially perpendicular to the web 36.

According to one variant, the frames 34 are metallic. However, they may be made of composite material.

The frames 34 and the panel 30 are connected by clips 40. According to one embodiment shown in FIG. 2B, each clip 40 comprises at least two flanges 42.1 and 42.2 connected so as to form an angle bar, a first flange 42.1, called the sole, clamped against the internal face 30I of a panel 30 and a second flange 42.2 clamped against the web 36 of a frame 34.

Figure 4:
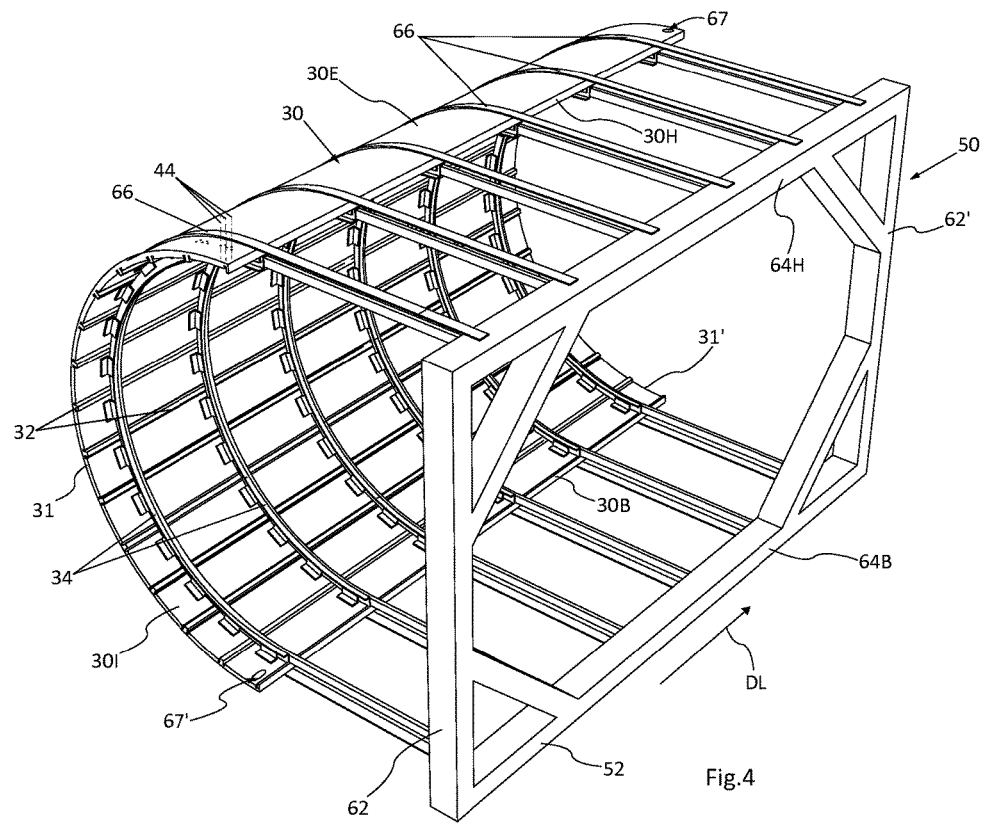
FIG. 4 is a perspective view of the tool shown in FIG. 3 after the placement of a panel and the frames.

The sole 42.1 of each clip 40 is secured to the panel 30 using connection elements 44 such as bolts or rivets (some are shown in FIG. 4). These connection elements 44 comprise milled heads which are housed in milled portions provided in the external face 30E of the panel 30 so as not to impair its aerodynamic properties.

The second flange 42.2 of each clip 40 is secured to the web 36 using connection elements 46 such as bolts or rivets.

According to one variant, these clips are metallic. However, other materials could be envisioned.

The panel 30, the frames 34 and the clips 40 are not described further as they can be identical to those of the first operating method of the prior art.

As shown in FIG. 3, before assembly, the panel 30 is produced and reinforced with the stringers 32 while flat. This solution makes it possible to simplify the method for producing the reinforced panels 30. Thus, in the case of panels 30 and stringers 32 made of composite material, it is possible to automate the method for manufacturing the panels, in particular by using automatic lay-up machines.

As shown in FIGS. 2A and 2B, the frames 34 have a profile which follows a reference line of curvature Lc in a transverse plane, the line of curvature Lc depending on the position of the frame in the fuselage. Before assembly with the panel or panels, the clips 40 are attached to the frames 34 with the permanent attachment elements 46. According to one embodiment, each frame is curved along its reference line of curvature Lc and the clips 40 are attached by an automatic structure for installing the attachment elements 46.

The subject matter disclosed herein is not limited to the embodiments described above relating to the panel 30 and the frames. Thus, the panel 30 may be reinforced with elements other than stringers. Moreover, according to another variant, the frames 34 are connected directly to the panel 30, without the intermediary of clips. In this case, the frames are the to be integral.

For the remainder of the description, a frame is understood as an integral frame directly connected to the panel or the assembly formed by a frame equipped with clips.

Whatever the variant, a frame 34 comprises soles 42.1 which are clamped against the internal face 30I of the panel 30 and which are connected to the panel 30 by attachment elements 44.

Advantageously, before assembly with the panel or panels, the soles 42.1 comprise at least one pilot hole 48 which will be used to place a pin in order to immobilize each sole 42.1 relative to the panel 30 when installing the permanent attachment elements 44. For preference, each sole 42.1 comprises at least two pilot holes 48 (shown in FIG. 2B).

Once the panel 30 and the frames 34 are assembled, the external surface 30E of the panel 30 must be positioned according to a reference surface, to within the shape tolerances. Similarly, each frame must be positioned according to a reference position, to within the dimensional tolerances.

For assembling the panel 30 and the integral frames 34, use is made of a tool 50 comprising a scaffold 52 which supports a plurality of support surfaces 54 and ribs 56, one for each integral frame 34. These support surfaces 54 are distinct from the frames and are positioned on the side of the internal face 30I of the panel 30. Moreover, the support surfaces 54 and the ribs are positioned on the same side of the panel 30.

During assembly, the internal face 30I of the panel is clamped against the support surfaces 54 which are connected to the scaffold 52 sufficiently rigidly to allow the panel to deform from a flat shape to a curved shape. To that end, the shapes of the support surfaces 54 are such that, when the panel 30 bears against them, it has a curved shape matching that of the corresponding portion of the fuselage. Consequently, the support surfaces 54 have at least one radius of curvature in a transverse plane.

Thus, when the internal surface 30I of the panel 30 is clamped against the support surfaces 54, certain points of the panel 30 are positioned within a tolerance range with respect to their reference positions.

According to one embodiment, each support surface 54 comprises a strip of material 58 with lateral edges 60, 60' arranged in transverse planes. To indicate an order of magnitude, the lateral edges 60, 60' are separated by a distance of the order of 3 to 15 cm.

According to one embodiment, the scaffold 52 comprises a frame with uprights 62, 62' connected by an upper crosspiece 64H and a lower crosspiece 64B. For a given panel 30, the upper crosspiece 64H extends according to a profile identical to that of the upper edge 30H of the panel and the lower crosspiece 64B extends according to a profile identical to that of the lower edge 30B of the panel.

Each strip of material 58 extends from the upper crosspiece 64H to the lower crosspiece 64B and has a curvature which depends on the curvature of the panel 30 in the transverse plane occupied by the strip of material 58.

The tool 50 also comprises a holder for holding the panel 30 clamped against the support surfaces 54. According to one embodiment, the holder comprises straps 66 which are tautened between the upper crosspiece 64H and the lower crosspiece 64B of the scaffold 52. The tool comprises as many straps 66 as there are support surfaces 54. For preference, the straps 66 are arranged facing the support surfaces 54 (in the same transverse planes), such that the panel 30 is positioned between a strap and a support surface.

Advantageously, the tool 50 comprises a positioner for positioning the panel 30 with respect to the tool 50. The positioner can comprise at least one locating pin 67 and at least one point support 67'.

According to one embodiment, the locating pin 67 is secured to the tool and comprises a cylindrical peg with an axis perpendicular to the support surface. In addition, the panel 30 comprises an orifice 68 whose diameter is substantially equal to that of the peg. Thus, the locating pin 67 makes it possible to immobilize the panel 30 in translation with respect to the tool 50. The locating pin allows only one degree of freedom: that of rotation about the locating pin. This degree of freedom is eliminated by the point support 67'.

According to one embodiment, the point support 67' is secured to the tool and comprises a cylindrical peg with an axis perpendicular to the support surface. In addition, the panel 30 comprises an oblong hole 70 in which the peg is housed, the width of the oblong hole being substantially equal to the diameter of the peg.

Other variants may be envisioned for the positioner.

The panel can comprise pilot holes 72 (shown in FIG. 3) positioned so as to line up with the pilot holes 48 of the soles of the frames. The diameter of these pilot holes 72 is greater than that of the pilot holes 48 of the soles.

According to one feature of the subject matter disclosed herein, each rib 56 comprises at least one sliding support surface 74. These sliding surfaces 74 are all positioned on the same side of the panel 30, on the concave side.

According to one embodiment, each rib 56 comprises a single sliding support surface 74 which extends over approximately an arc of 180°. As a variant, each rib 56 comprises multiple separate and coplanar sliding support surfaces.

For each rib, the sliding support surface or surfaces extends or extend in a transverse plane.

The support surfaces 54 and the sliding support surfaces 74 are secured to the same tool and are positioned relative to one another such that, once mounted, the frames are positioned correctly relative to the panel 30.

According to one embodiment, each rib 56 comprises at least one sliding support surface 74 and at least one support surface 54.

Each rib 56 comprises a rigid structure connected to the scaffold which extends in a transverse plane with a peripheral support surface 54 and on one of its faces at least one sliding support surface 74 parallel to a transverse plane.

During assembly, the frame 34 is clamped against the sliding support surface 74. In the case of a frame with a Z-shaped cross section, the web 36 of the frame is clamped against the sliding support surface 74.

According to one embodiment, the sliding support surface 74 comprises a coating or is made of a material which promotes sliding, such as polyacetal.

The tool 50 also comprises for each rib 56 at least one brace 76 by which the frame can be held clamped against the sliding support surface 74. Advantageously, each rib comprises multiple braces 76 distributed all along the line of curvature Lc.

According to one embodiment, each brace 76 comprises a counter-support 78 which can move between an active position in which the counter-support 78 is in contact with the frame 34 and holds it clamped against the sliding support surface 74 and a free position in which the counter-support 78 is moved away from the frame such that the latter can be mounted and removed. For preference, the brace 76 comprises a clevis 80 which is fixed with respect to the tool 50 and a lever 82 which pivots with respect to the clevis 80 and which supports the counter-support 78.

Each brace 76 comprises a locking and unlocking system for keeping the counter-support 78 in the active position.

For preference, the counter-support 78 allows the frame to slide in a radial direction.

According to one embodiment, the counter-support comprises a coating or is made of a material which promotes sliding, such as polyacetal.

Figure 5:
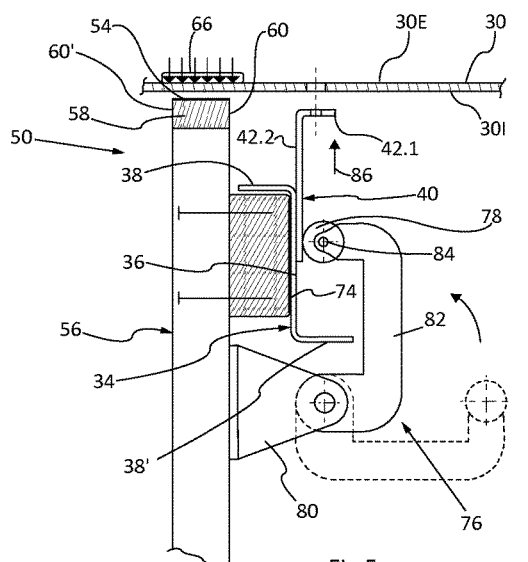
FIG. 5 is a section through a longitudinal plane of part of the tool shown in FIG. 3.

According to another embodiment shown in FIG. 5, the counter-support 78 takes the form of a roller mounted such that it can pivot on a pivot spindle 84 arranged in a transverse plane and perpendicular to a radial direction 86. This configuration allows the frame to move in translation in the radial direction 86 while still being held clamped against the sliding support surface 74.

A radial direction at a given point corresponds to a direction perpendicular to the tangent to the line of curvature at the given point.

Advantageously, the tool 50 comprises for each rib 56 at least one positioner 88 for positioning the frame 36. For preference, each positioner 88 immobilizes the frame along the line of curvature Lc but allows a translational movement in the radial direction 86 so as to allow the position of the frame to be adjusted in the radial direction.

Figure 6:
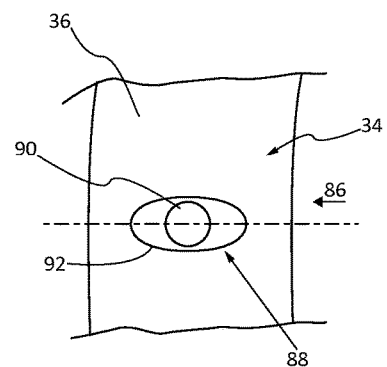
FIG. 6 is a front view of a positioner for positioning a frame, showing an embodiment of the subject matter disclosed herein.

According to one embodiment shown in FIG. 6, each positioner 88 comprises a locating pin 90 secured to the tool and the frame 36 comprises an oblong opening 92 in which the locating pin 90 is housed. The width of the oblong opening 92 is substantially equal to the diameter of the locating pin and the length of the oblong opening is greater than the diameter of the locating pin so as to allow the frame to move radially.

In one aspect, each rib comprises a single positioner 88 arranged equidistant from the ends of the frame.

The assembly method will now be described:

First, the panel 30 is positioned on the tool 50. To that end, the panel 30 is curved so as to be clamped against the support surfaces 54. The panel 30 is positioned with respect to the tool 30 by the locating pin 67 and the point support 67'. The straps 66 are put in place so as to hold the panel 30 clamped against the support surfaces 54. Bracing the panel in this manner makes it very rigid when the panel is subjected to a force perpendicular to its surface.

Then, the frames are put in place one after another. Each one is first positioned using the positioner 88, then clamped against the sliding support surface 74 and held clamped by the braces 76.

Then, at each sole, the frame 36 is connected to the panel 30 by pins which pass through the pilot holes 48 and 72. In order to control the internal stresses induced during assembly, the pins exert a clamping force on the skin and the sole of the order of 20 daN. According to the subject matter disclosed herein, the clamping forces applied to the frame generate no torsion provided that the frame is held clamped against the sliding support surfaces and can slide radially.

The clearance between the soles and the panel 30 is measured to determine if the use of shims is necessary. If the clearance measured is less than a given value of the order of 0.3 mm, it is considered that the stresses produced by the permanent attachment elements to compensate for the clearance will be acceptable. In the opposite case, if the clearance is greater than the given value, shims are placed between the parts to be assembled so as to reduce the clearance.

Then, all the holes intended for placing the permanent attachment elements are drilled and milled.

Once these machining steps have been performed, the frames are removed in order to clean the surfaces of the soles and to coat them with an interposition mastic.

Each frame is then re-mounted starting from the positioner 88 located equidistant from the ends of the frame, then by unrolling each of the ends. The frames are held in position by the braces 76.

Once the frames have been braced, the permanent attachment elements are put in place.

As for the drilling/milling, the permanent attachment elements can be placed by an automatic machine acting from the external face of the panel.

After the permanent attachment elements have been placed, the straps 66 are removed and the braces 76 are positioned in the free position so as to remove the panel/frames assembly from the tool 50.

The method of the subject matter disclosed herein makes it possible to assemble at least one panel and frames in an automated manner, wherein, in a first phase, the clips are attached to the frames, then, in a second phase, the panel or panels is/are attached to the frames equipped with clips.

Moreover, this method makes it possible to control the internal stresses induced during assembly.

Another advantage is that it is easier to position the frames one after another relative to the panel than to position the panel with respect to all the frames.

While at least one exemplary embodiment of the present invention has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method for assembling at least one panel and frames, which are part of an aircraft fuselage, the method comprising:
shaping the at least one panel on support surfaces of a tool, the support surfaces having at least one radius of curvature in a transverse plane, the frames following a reference line of curvature;
holding each frame clamped against at least one sliding support surface arranged in a transverse plane, the sliding support surfaces and the support surfaces being secured to the same tool and positioned relative to one another; and
putting in place permanent attachment elements for connecting the at least one panel to the frames.

2. The assembly method according to claim 1, comprising positioning each frame with respect to its sliding support surface after having shaped the panel.

3. The assembly method according to claim 2, comprising positioning each frame by immobilizing it along its line of curvature while allowing a translational movement in a radial direction.

4. The assembly method according to claim 3, wherein each frame is positioned with respect to a positioner arranged equidistant from the ends of the frame, and wherein the ends are subsequently unrolled so as to come into contact with the panel.

5. The assembly method according to claim 3, comprising using at least one brace for holding each frame clamped against the sliding support surface, the brace comprising a counter-support in contact with the frame which allows the frame to move in translation in the radial direction.

6. The assembly method according to claim 1, comprising using straps for holding the panel clamped against the support surfaces.

* * * * *